United States Patent
Picard (10) Patent No.: US 11,522,441 B2
(45) Date of Patent: Dec. 6, 2022

(54) SWITCHING CONVERTER CONTROLLER WITH SOFT STOP

(71) Applicant: TEXAS INSTRUMENTS INCORPORATED, Dallas, TX (US)

(72) Inventor: Jean Picard, Hooksett, NH (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 101 days.

(21) Appl. No.: 17/088,671

(22) Filed: Nov. 4, 2020

(65) Prior Publication Data

US 2021/0143737 A1    May 13, 2021

Related U.S. Application Data

(60) Provisional application No. 62/932,877, filed on Nov. 8, 2019.

(51) Int. Cl.
    *H02M 1/36*      (2007.01)
    *H02M 3/335*     (2006.01)
    *H02M 1/32*      (2007.01)

(52) U.S. Cl.
    CPC .......... *H02M 1/322* (2021.05); *H02M 1/32* (2013.01); *H02M 1/36* (2013.01); *H02M 3/33569* (2013.01)

(58) Field of Classification Search
    CPC .......... H02M 1/32; H02M 1/322; H02M 1/36; H02M 3/335; H02M 3/33569
    See application file for complete search history.

(56) References Cited

U.S. PATENT DOCUMENTS

| | | | |
|---|---|---|---|
| 8,379,419 B2* | 2/2013 | Yabuzaki | H02M 1/4225 361/91.1 |
| 9,287,772 B2* | 3/2016 | Hussien | H02M 3/156 |
| 2014/0210445 A1* | 7/2014 | Hasegawa | H04W 64/006 323/284 |
| 2019/0115826 A1* | 4/2019 | Leisten | H02M 3/157 |
| 2021/0143742 A1 | 5/2021 | Picard | |

* cited by examiner

*Primary Examiner* — Gary L Laxton
(74) *Attorney, Agent, or Firm* — Michael A. Davis., Jr.; Frank D. Cimino (57) ABSTRACT

A switching converter controller includes a detection circuit, an input load circuit, and a timer circuit. The detection circuit is configured to compare voltage at a power stage voltage input to a line undervoltage threshold voltage to initiate a soft stop operation. The input load circuit is coupled to the power stage voltage input. The input load circuit is configured to, responsive to the soft stop operation, switchably reduce a resistance from the power stage voltage input to a ground terminal. The timer circuit is configured to set a duration of reduced resistance from the power stage voltage input to the ground terminal.

22 Claims, 5 Drawing Sheets

SWITCHING CONVERTER CONTROLLER WITH SOFT STOP

CROSS-REFERENCE TO RELATED APPLICATION

This application claims priority to U.S. Provisional Patent Application No. 62/932,877, filed Nov. 8, 2019, entitled "Soft Stop Circuit with Load Control," which is hereby incorporated herein by reference in its entirety.

BACKGROUND

A switching converter is an electronic circuit that converts an input direct current (DC) supply voltage into one or more DC output voltages that are higher or lower in magnitude than the input DC supply voltage. A switching converter may include a controller and one or more power devices. The controller activates and deactivates the power devices to regulate the voltage provided at the output of the switching converter.

SUMMARY

In one example, a switching converter controller includes a detection circuit, a timer circuit, and an input load circuit. The detection circuit includes a power stage voltage input, and a soft stop output. The timer circuit includes an input coupled to the soft stop output, and a timer output. The input load circuit includes a first input coupled to the timer output, and a second input adapted to be coupled to the power stage voltage input.

In another example, a switching converter controller includes a detection circuit, an input load circuit, and a timer circuit. The detection circuit is configured to compare voltage at a power stage voltage input to a line undervoltage threshold voltage to initiate a soft stop operation. The input load circuit is coupled to the power stage voltage input. The input load circuit is configured to, responsive to the soft stop operation, switchably reduce a resistance from the power stage voltage input to a ground terminal. The timer circuit is configured to set a duration of reduced resistance from the power stage voltage input to the ground terminal.

In a further example, a switching converter includes a power stage and a switching converter controller. The power stage includes a power supply input, an input capacitor, and a power output. The power supply input is adapted to be coupled to a power supply. The input capacitor is coupled to the power supply input. The power output is adapted to be coupled to a load circuit. The switching converter controller is configured to control the power stage. The switching converter controller includes a power stage voltage input, a detection circuit, an input load circuit, and a timer circuit. The power stage voltage input is coupled to the power supply input. The detection circuit is configured to compare voltage at the power stage voltage input to a line undervoltage threshold voltage. The detection circuit is also configured to generate a soft stop signal based on the voltage at the power stage voltage input being less than the line undervoltage threshold voltage. The input load circuit is coupled to the power stage voltage input and is configured to switchably discharge the input capacitor. The timer circuit is configured to time a duration of discharge of the input capacitor responsive to the soft stop signal.

DETAILED DESCRIPTION

In some switching converter topologies such as active clamp forward (ACF) or flyback topologies, high stress on power field-effect transistors (FETs) is likely in power down circumstances. An ACF example includes a transformer having a primary-side coil and a secondary-side coil. The primary-side coil has a first end coupled to a power supply and a second end coupled to primary-side components, such as an n-channel FET (NFET), a capacitor (CCLAMP), and a p-channel FET (PFET). At power down, the input power rail falls, and the duty-cycle increases, to maintain the output voltage resulting in high voltage levels at some primary-side components (e.g., CCLAMP, the NFET, and the PFET) with potentially damaging overvoltage and oscillations. At the next power up, due to a precharged CCLAMP, the soft start could also cause transformer saturation and severe stress on switching components, such as the primary-side NFET and the secondary-side sync FET.

In another scenario, switching "stops abruptly" due to a pulse-width-modulation (PWM) undervoltage lockout (UVLO) condition. In that scenario, a first sync FET has current terminals coupled between a first end of the transformer's secondary-side coil and ground. Also, a second sync FET has current terminals coupled between a second end of the transformer's secondary-side coil and ground. A PWM UVLO condition has a risk of reverse current flow ("backdrive") from the output capacitor, resulting in turning on the second sync FET once, and then both the first and second sync FETs are alternatively activated by the transformer, which causes stress to the first and second FETs. To accommodate such stress, some switching converters use NFETs with a higher voltage rating and/or PFETs with a higher current capability for each of the ACF FETs described, which substantially increases converter cost.

Some switching converters, including some switching converters implementing ACF or flyback topologies, support soft stop operation. As used herein, a "soft stop" refers to operations that safely discharge the output voltage, even in a light load condition (without damaging components due to high voltage or high current levels). For example, soft stop operations may be initiated responsive to the input voltage dropping below a line undervoltage threshold voltage (LINEUV threshold).

In soft stop operation, energy is transferred from the output capacitance of the switching converter to the input capacitance of the switching converter when the switching converter's input voltage drops below the LINEUV threshold. As a result of this energy transfer, the switching converter's input voltage may rise above the LINEUV threshold during soft stop, which may cause the switching converter to restart one or more times until the switching converter's input capacitance is completely discharged. Restarting during soft stop is referred to as "last gasps" and is undesirable in many applications.

Figure 1:
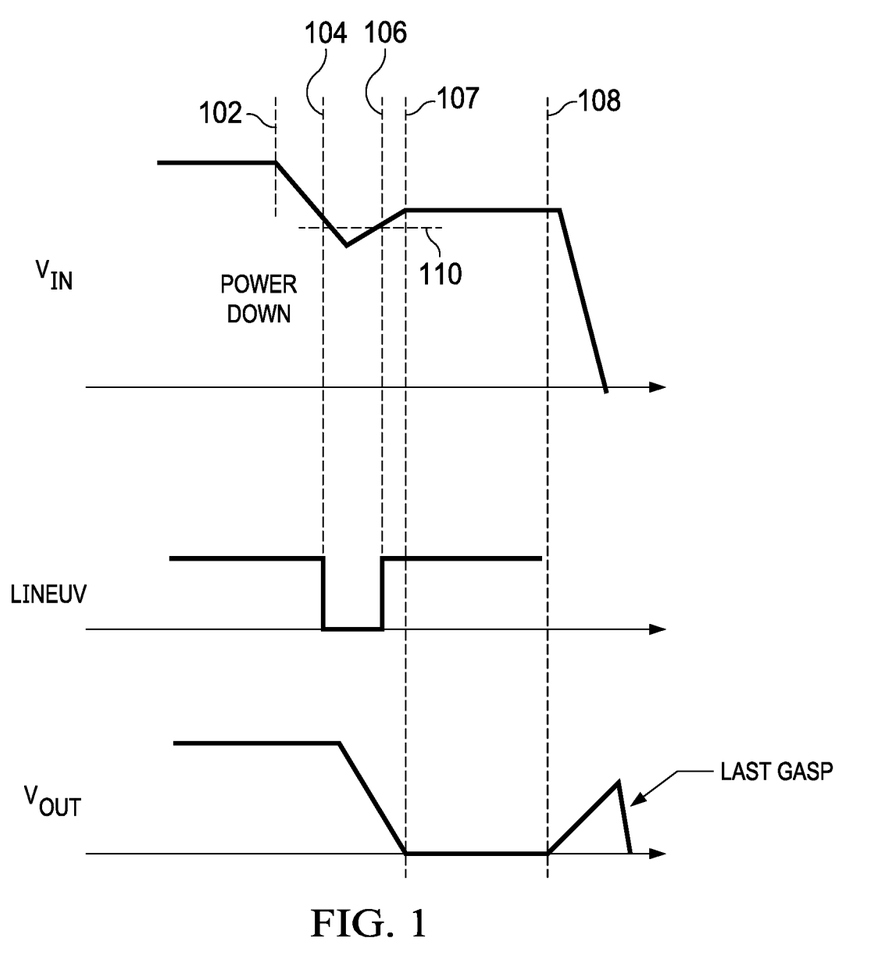
FIG. 1 is a timing diagram of example signals in a switching converter with soft stop operation that initiates a last gasp.

FIG. 1 is an example of soft stop operation that initiates a last gasp in a switching converter. In FIG. 1, $V_{IN}$ is switching converter input voltage, LINEUV indicates whether $V_{IN}$ is above or below the threshold voltage LINEUV threshold 110, and $V_{OUT}$ is switching converter output voltage. At time 102, $V_{IN}$ begins to decrease to power down the switching converter. At time 104, $V_{IN}$ falls below the LINEUV threshold 110, and the switching converter initiates soft stop operations. During soft stop, $V_{OUT}$ decreases, and energy is transferred from the output capacitance to the input capacitance of the switching converter, causing $V_{IN}$ to exceed the LINEUV threshold 110 at time 106. Because $V_{IN}$ exceeds the LINEUV threshold 110, the switching converter restarts at time 108, and $V_{OUT}$ increases in a "last gasp" until the input capacitance of the switching converter is fully discharged.

The switching converters described herein prevent last gap operation by switching a load onto the input of the switching converter at the end of soft stop to discharge the input capacitance. The load is enabled for a predetermined time sufficient to ensure the voltage across the input capacitance falls below the LINEUV threshold. At expiration of the predetermined time, the load is disconnected from the input of the switching converter, and the switching converter determines whether to restart based on whether $V_{IN}$ exceeds the LINEUV threshold. Thus, the switching converters prevent last gasp generation without decreasing the efficiency of the switching converter, and without substantially increasing circuit area or cost of the switching converter.

Figure 2:
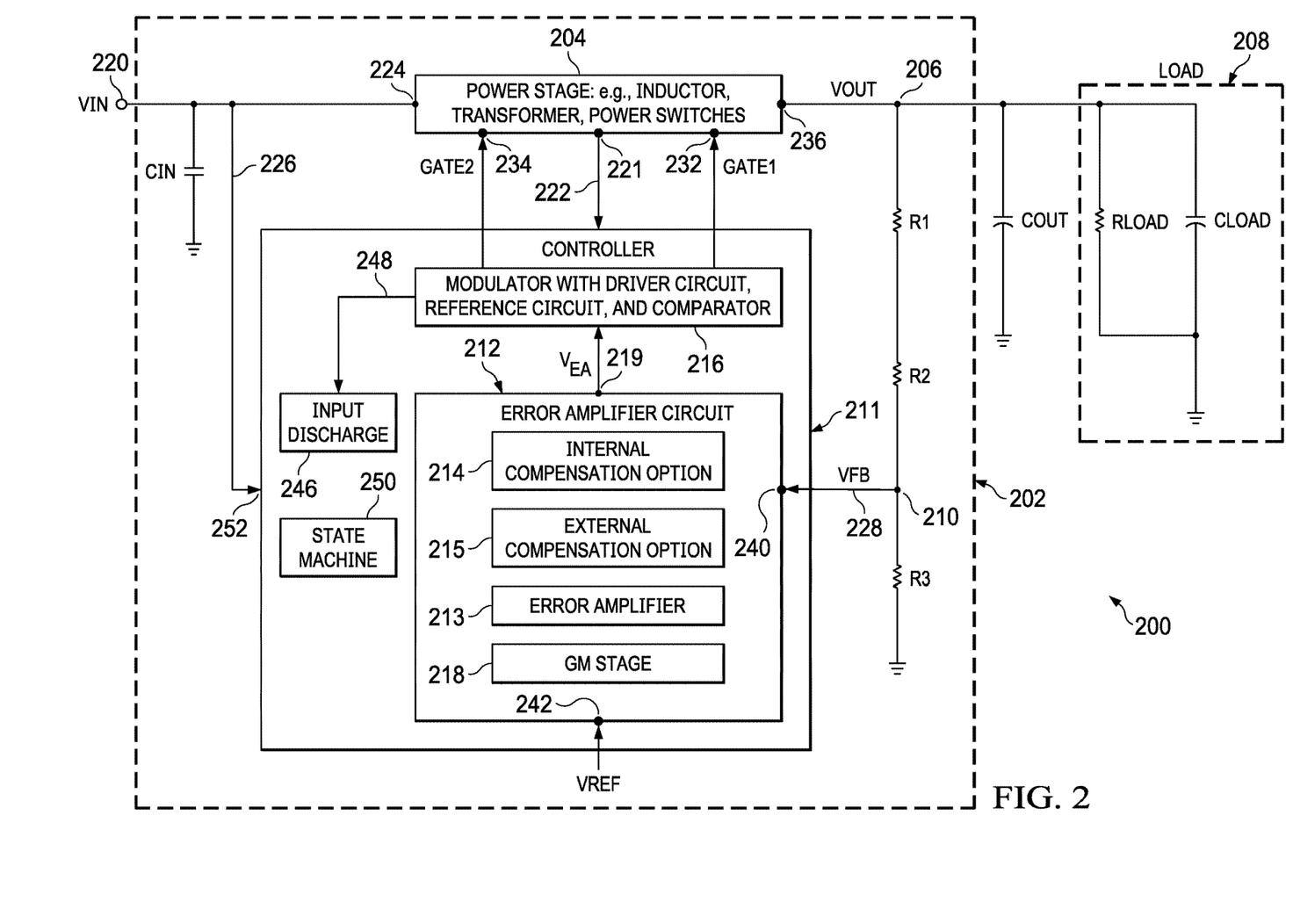
FIG. 2 is a block diagram of a system in accordance with an example embodiment.

FIG. 2 is a block diagram of a system 200 in accordance with an example embodiment. As shown, the system 200 includes a switching converter 202 coupled to an output capacitor (COUT) and a load 208. In the example of FIG. 2, the load 208 is represented as a resistor (RLOAD) and a capacitor (CLOAD). In some example embodiments, the system 200 is a power-over-Ethernet (PoE) system, and the load 208 is a subsequent converter having a lower output voltage (VOUT) range compared to the switching converter 202. The switching converter 202 includes a power stage 204 coupled to a switching converter controller 211, and an input capacitor (CIN) coupled to the power stage 204 and the switching converter controller 211. Example components of the power stage 204 include power switches (FETs), an inductor, and a transformer. Example topologies for the power stage include ACF, flyback, or other topologies.

As shown, the switching converter controller 211 is configured to provide gate drive signals (e.g., GATE1 and GATE2) to the power stage 204, where timing of the gate drive signals is a function of VIN 226 received by the switching converter controller 211 (via a power stage voltage input 252) from a VIN terminal 220 (power supply input) or a power stage power input 224, VOUT from a power output 206 (or a scaled VOUT from a voltage divider output 210), and the load 208 (e.g., a current sense voltage 222 from a current terminal 221 indicative of the load 208). In the example of FIG. 2, the switching converter controller 211 receives a feedback voltage (VFB) 228 from the voltage divider output 210, where VFB is a scaled version of VOUT, and where the scaling is performed using a voltage divider (e.g., R1, R2, R3). As shown, VFB and a reference voltage (VREF) are provided to an error amplifier circuit 212 of the switching converter controller 211. In some example embodiments, the error amplifier circuit 212 includes a first error amplifier input 240, a second error amplifier input 242, an error amplifier output 219, internal compensation option 214, an external compensation option 215, an error amplifier 213, and a transconductance stage 218.

During normal operations of the switching converter controller 211, the error amplifier circuit 212 is configured to provide an error amplifier output ($V_{EA}$) to the error amplifier output 219 based on VFB received at the first error amplifier input 240 and VREF received at the second error amplifier input 242. However, during soft stop operations of the switching converter controller 211, the error amplifier circuit 212 is bypassed, and the peak current control is defined by soft stop circuitry in the modulator 216. In the example of FIG. 1, the modulator 216 includes a driver circuit, a reference circuit, and a comparator to perform soft stop operations as described herein.

With the soft stop circuitry, the modulator 216 is configured to initially adjust a peak current to a reduced value near a minimum duty cycle threshold responsive to detecting that VIN drops below the VIN threshold. The peak current value is kept at the reduced value until a signal derived from a soft start ramp goes below the reduced value. After the derived signal goes below the reduced value, the peak current is defined using the derived signal. With the soft stop circuitry, soft stop operations of the modulator 216 are effective immediately at high current, enabling protection for power FETs of the power stage 204 while minimizing costs without significant system tradeoffs.

The switching converter controller 211 includes input discharge circuitry 246 to prevent the last gasp operation illustrated in FIG. 1. The input discharge circuitry 246 is coupled to the modulator 216 for receipt of a SOFTSTOP signal 248 that defines an interval during which soft stop operations are performed. At an end of the soft stop operations, the input discharge circuitry 246 switches a load onto the power stage power input 224 for a predetermined interval to discharge the input capacitor CIN.

The switching converter controller 211 also includes a state machine circuit 250 that controls sequencing of operations within the switching converter controller 211. For example, the state machine circuit 250 may: initiate loading of the power stage power input 224 at the end of soft start operations; and enable restart of the switching converter 202 based on VIN after expiration of the predetermined interval set for discharging the input capacitor CIN. Accordingly, the state machine circuit 250 may disable normal operation of the switching converter 202 during the predetermined interval set for discharging the input capacitor CIN to prevent last gasp occurrence. After expiration of the time set for discharging the input capacitor CIN, if VIN exceeds the LINEUV threshold, then the voltage of VIN is not due to soft stop operations, and the switching converter can be safely restarted.

Figure 3:
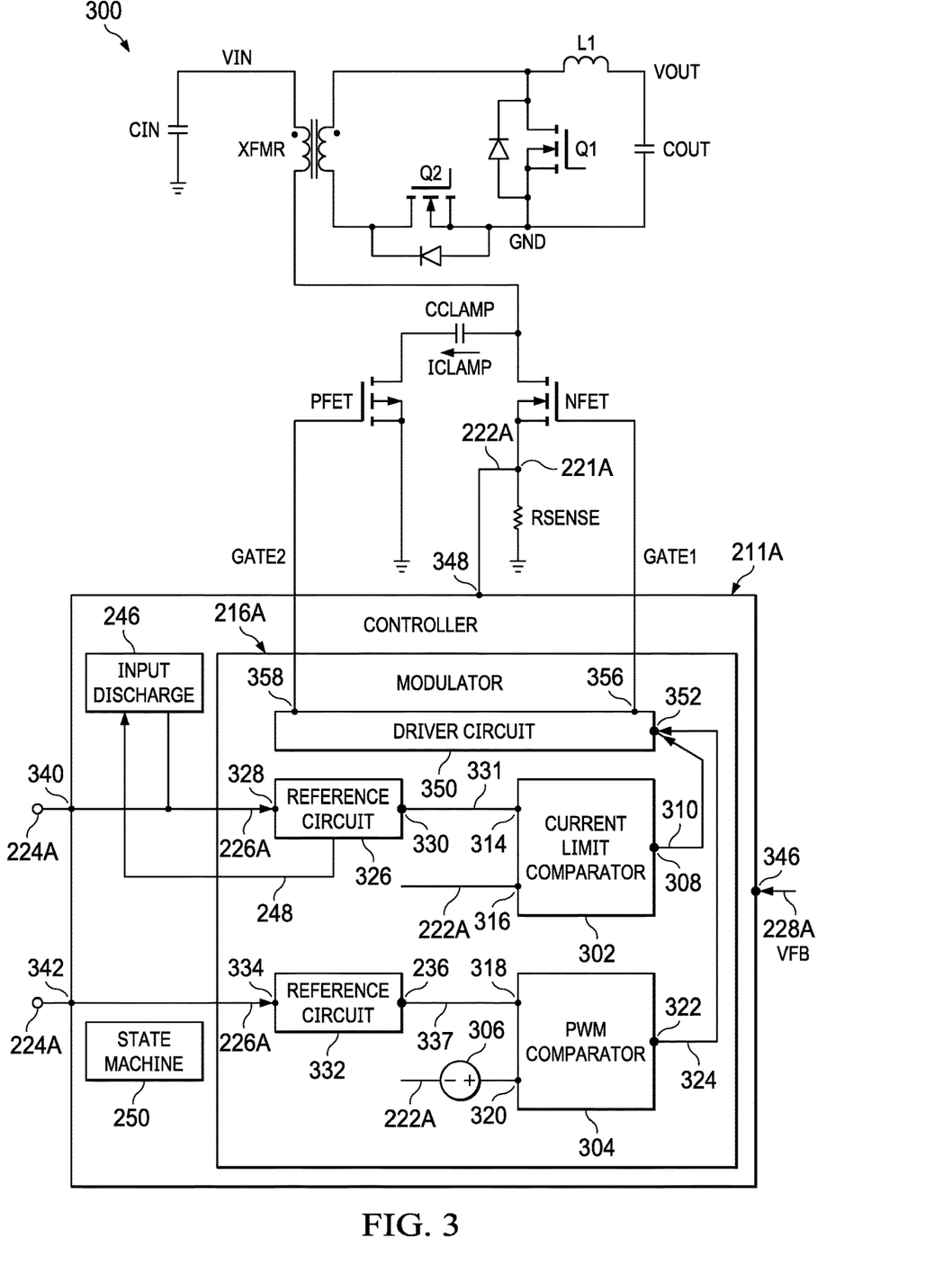
FIG. 3 is a diagram of another system in accordance with an example embodiment.

FIG. 3 is a diagram of another system 300 (e.g., an example of the system 200 in FIG. 2) in accordance with an example embodiment. In some example embodiments, the system 300 is part of a PoE adapter. In the system 300, a power stage having an ACF topology is represented, where the power stage includes a power supply (to provide VIN), and a transformer (XFMR) having a primary-side coil and secondary-side coil. More specifically, a first end of the primary-side coil is coupled to the power supply, while a second end of the primary-side coil is coupled to an n-channel FET (NFET) and to a p-channel FET (PFET). As shown, the second end of the primary-side coil has a first path to ground via NFET and a sense resistor (RSENSE), where a first end of RSENSE is coupled to a current terminal of NFET, and a second end of RSENSE is coupled to ground. The second end of the primary-side coil has a second path to ground via a clamp capacitor (CCLAMP) and the PFET. The control terminals of the PFET and the NFET are coupled to a switching converter controller 211A (an example of the switching converter controller 211 in FIG. 2), where the switching converter controller 211A is configured to provide a first gate drive signal (GATE1) to the NFET and a second gate drive signal (GATE2) to the PFET. In the example of FIG. 3, GATE1 and GATE2 have the same polarity, each with some off time. As shown, the secondary-side coil is coupled to power FETs (Q1 and Q2). More specifically, a first (e.g., top) end of the secondary-side coil is coupled to ground (GND) via Q1. The first end of the second-side coil is coupled to a first end of inductor L1, where the second end of L1 is coupled to an output capacitor (COUT). Also, a second (e.g., bottom) end of the secondary-side coil is coupled to GND via Q2.

In operation, the switching converter controller 211A provides GATE1 and GATE2 to control the timing of on/off cycles of the power stage as a function of VIN, VOUT, and a load (not shown in FIG. 3) coupled in parallel with COUT. When the NFET and Q2 are on (the PFET and Q1 off), the power stage is in an "on" cycle, and the energy in L1 is ramped up. When the PFET and Q1 are on (the NFET and Q2 off), the power stage is in an "off" cycle, and the energy in L1 is ramped down. Because XFMR has to reset every cycle, an increase in the on-time duty cycle results in a reduction in the available reset window for XFMR. This reset goes through CCLAMP, where the amount of voltage change/current change needed to reset XFMR is a function of the available reset window. The voltage on CCLAMP affects the NFET first, then PFET. In one scenario, if CCLAMP has a high voltage, then in an on cycle with soft start, XFMR will be saturated, and the NFET and the PFET will be under severe stress. Another scenario arises in which current flows in the reverse direction from COUT (e.g., due to a light load condition), which puts Q1 and Q2 under severe stress. In the example of FIG. 3, the switching converter controller 211A is configured to provide GATE1 and GATE2 based in part on a soft stop mechanism that enables reduction in cost of the power stage FETs.

In some example embodiments, the soft stop mechanism of the switching converter controller 211A is performed by a modulator 216A (an example of the modulator 216 in FIG. 1) having a driver circuit 350 coupled to a current limit comparator 302 or a PWM comparator 304. As shown, the driver circuit 350 includes a driver input 352 coupled to a comparator output 308 of the current limit comparator 302 and configured to receive signal 310, or coupled to a comparator output 322 of the PWM comparator 304 and configured to receive signal 324. The driver circuit 350 also includes driver outputs 356 and 358, where driver output 356 provides GATE1, and where driver output 358 provides GATE2 responsive to the signal 310 or signal 324 received at driver input 352. In some example embodiments, such as a flyback power stage topology, one of the FETS (e.g., PFET) could be directly driven by XFMR. In this case, GATE2 from the switching converter controller 211A is unnecessary, and only GATE1 is provided.

In the example of FIG. 3, signal 310 is a function of a current sense voltage 222A (an example of the current sense voltage 222 in FIG. 2) provided via a controller input 348 to a current sense input 316 of the current limit comparator 302, along with a reference voltage 331 provided by a reference output 330 of a reference circuit 326 to a reference input 314 of the current limit comparator 302. As shown, the reference circuit 326 also includes a reference input 328 coupled to a power stage power input 224A (an example of the power stage power input 224 in FIG. 2) via a controller input 340 (an example of the power stage voltage input 252) and configured to receive VIN 226A (an example of VIN 226 in FIG. 2). In operation, the reference circuit 326 is configured to adjust the reference voltage 331 (e.g., provide a reduced reference voltage) at the reference output 330 responsive to VIN 226A being below a threshold voltage.

In the example of FIG. 3, signal 324 is a function of a current sense voltage 222A plus an offset (an example of the current sense voltage 222 in FIG. 2 plus an offset, where the offset is added by a voltage source 306) provided to a current sense input 320 of the PWM comparator 304, along with a reference voltage 337 provided by a reference output 336 of a reference circuit 332 to a reference input 318 of the PWM comparator 304. As shown, the reference circuit 332 also includes a reference input 334 coupled to the power stage power input 224A (an example of the power stage power input 224 in FIG. 2) via a controller input 342 and configured to receive VIN 226A (an example of VIN 226 in FIG. 1). In operation, the reference circuit 332 is configured to adjust the reference voltage 337 (e.g., provide a reduced reference voltage) at the reference output 336 responsive to VIN 226A being below a threshold voltage. FIG. 3 shows two reference circuits 326 and 332, but only one of the reference circuits 326 and 332 is needed, and only one of the current limit comparator 302 and the PWM comparator 304 is coupled to the reference output (e.g., the reference outputs 330 or 336) of a reference circuit. While not shown in detail in the example of FIG. 3, the switching converter controller 211A may also include an error amplifier circuit (e.g., the error amplifier circuit 212 in FIG. 2), where VFB 228A (an example of VFB 228 in FIG. 2) is provided to a control input 346 of the switching converter controller 211A. In some example embodiments, the switching converter controller 211A is configured to bypass its error amplifier circuit during soft stop operations.

In one soft stop option, a current limit comparator 302 of the modulator 216A receives a current sense voltage 222A from a current terminal 221A between the NFET and the first end of RSENSE, where the current sense voltage 222A is compared with the reference voltage 331 from a reference output 330 of the reference circuit 326. In the example of FIG. 3, reference voltage 331 is adjustable by the reference circuit 326 responsive to VIN 226A being below a VIN threshold. In one example, the reference circuit 326 is configured to reduce the reference voltage 331 responsive to detecting that VIN 226A drops below a VIN threshold.

In another soft stop option, the PWM comparator 304 of the modulator 216A receives the current sense voltage 222A from the current terminal 221A, where an offset (from a voltage source 306) is added to the current sense voltage 222A. In this soft stop option, the current sense voltage 222A plus offset (relative to the current sense voltage 222A at the current terminals 221A) is compared with a reference voltage 337 from a reference output 336 of the reference circuit 332. In the example of FIG. 3, the reference voltage 337 is adjustable by the reference circuit 332 responsive to VIN 226A being below a VIN threshold. In one example, the reference circuit 332 is configured to reduce the reference voltage 337 responsive to detecting that VIN 226A drops below a VIN threshold.

With the soft stop options represented in FIG. 3, the switching converter controller 211A is able to initially adjust a peak current to a reduced value near a minimum duty cycle threshold, responsive to detecting that VIN 226A drops below the VIN threshold. The peak current value is kept at the reduced value until a signal derived from a soft start ramp goes below the reduced value. After the derived signal goes below the reduced value, the peak current is defined using the derived signal. With the described soft stop options, soft stop will be effective immediately at high current, enabling protection and reduced costs for the power FETs of the power stage (e.g., the NFET, the PFET, Q1, and Q2).

The switching converter controller 211A includes the input discharge circuitry 246 and the state machine circuit 250 to prevent last gasp occurrence. During the soft stop operations described above, energy may be transferred from the output capacitor COUT to the input capacitor CIN, which may increase the voltage VIN. In the switching converter controller 211A, the reference circuit 326 (or the reference circuit 332) generates the SOFTSTOP signal 248. For example, the reference circuit 326 may include a comparator that compares the voltage VIN to the LINEUV threshold to identify power down of the system 300 and initiate soft stop operations. The SOFTSTOP signal 248 defines the interval during which soft stop operations are performed in the switching converter controller 211A. At the end of the soft stop operations (e.g., at a trailing edge of the SOFTSTOP signal 248), the input discharge circuitry 246 switches a load to the power stage voltage input 252 and the power stage power input 224A. The load remains connected to the power stage voltage input 252 and power stage power input 224A for a duration sufficient to discharge the input capacitor CIN to at least a degree that reduces VIN to a voltage below the LINEUV threshold.

The state machine circuit 250 controls sequencing of operations within the switching converter controller 211A. The state machine circuit 250 may disable normal operation of the system 300 during the predetermined interval set for discharging the input capacitor CIN to prevent last gasp occurrence. After expiration of the time set for discharging the input capacitor CIN, the state machine circuit 250 may enable normal operation of the system 300. And if VIN exceeds the LINEUV threshold, then the voltage of VIN is not due to soft stop operations, and the system 300 can be safely restarted.

Figure 4:
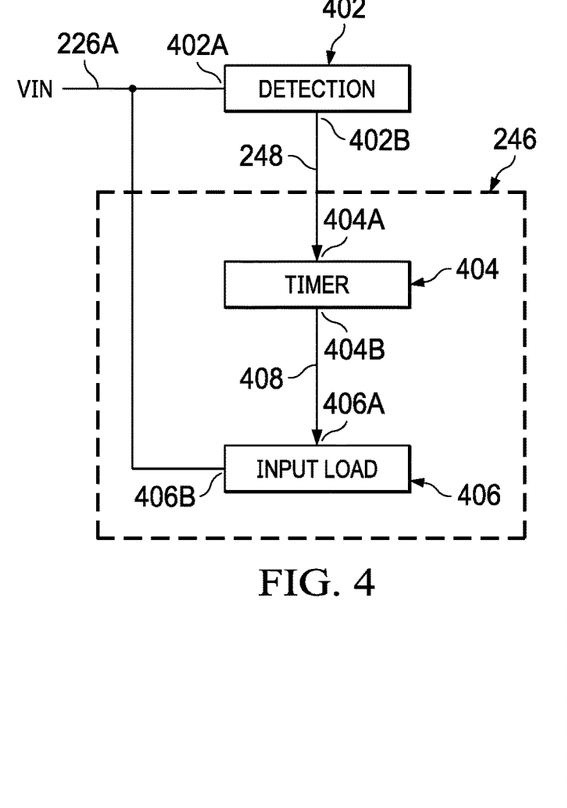
FIG. 4 is a block diagram of example input discharge circuitry.

FIG. 4 is a block diagram of example input discharge circuitry 246. The input discharge circuitry 246 includes a timer circuit 404 and an input load circuit 406. An input 404A of the timer circuit 404 is coupled to SOFTSTOP output 402B of the detection circuit 402 for receipt of the SOFTSTOP signal 248.

The detection circuit 402 may be a component of the reference circuit 326 or the reference circuit 332 in various embodiments of the switching converter controller 211A. The detection circuit 402 may include a comparator that compares the voltage VIN to the LINEUV threshold to identify power down of the system 300 and initiate soft stop operations.

The timer circuit 404 times the duration for connection of a load to the power stage power input 224A. Accordingly, the timer circuit 404 sets a predetermined duration (discharge time) for discharging the input capacitor CIN at the end of soft stop operations. The timer circuit 404 outputs a load signal 408 that specifies the time during which a load is to be switchably connected to the power stage power input 224A. The active width (the pulse width) of the load signal 408 may be set in the timer circuit 404 using a digital timer (e.g., a counter) or an analog timer (e.g., a capacitor charged at a predetermined rate with capacitor voltage compared to a threshold voltage).

Figure 5:
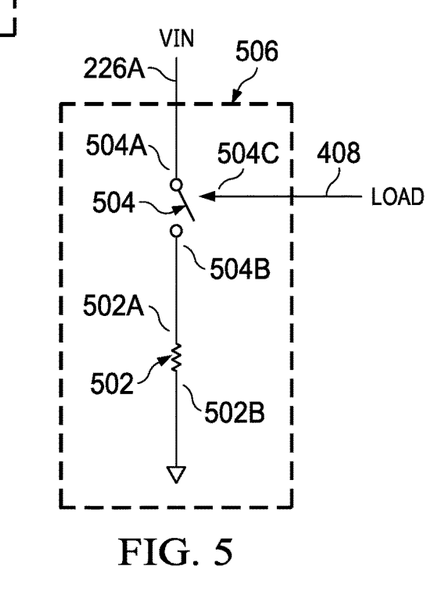
FIG. 5 is a schematic level diagram of an example input load circuit.

An input 406A of the input load circuit 406 is coupled to an output 404B of the timer circuit 404 for receipt of the load signal 408. When the load signal 408 is active, the input load circuit 406 switches a load onto the power stage power input 224A to discharge the input capacitor CIN. FIG. 5 shows an example input load circuit 506. The input load circuit 506 is an implementation of the input load circuit 406. The input load circuit 506 includes a resistor 502 and a switch 504. The switch 504 includes a terminal 504A coupled to the power stage power input 224A, a terminal 504B coupled to a terminal 502A of the resistor 502, and a control terminal 502C coupled to the output 404B of the timer circuit for receipt of the load signal 408. A terminal 502B of the resistor 502 is coupled to ground. When the load signal 408 is active, the switch 504 is closed, and the resistor 502 is connected to the power stage power input 224A. In various implementations of the system 300, the resistor 502 is external to the switching converter controller 211A or internal to the switching converter controller 211A. Connections of the resistor 502 and the switch 504 to ground and the power stage power input 224A may be swapped in some implementations.

Figure 6:
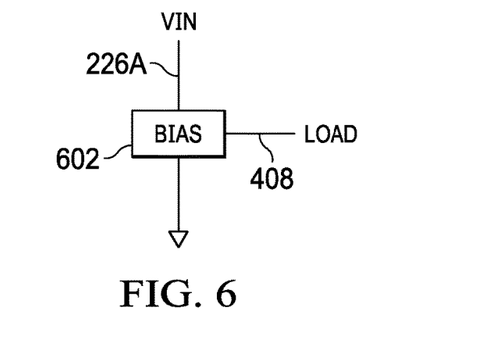
FIG. 6 is a block diagram of another example input load circuit.

FIG. 6 shows an example input load circuit 606. The input load circuit 606 is an implementation of the input load circuit 406. The input load circuit 602 is a bias circuit that generates bias voltage for use in the switching converter controller 211A. When the load signal 408 is active, the current consumed by the bias circuit increases (relative to the current consumed by the bias circuit when the load signal is inactive) to discharge the input capacitor CIN. For example, a switch in the bias circuit selects a lower resistance path to increase bias current flow.

Figure 7:
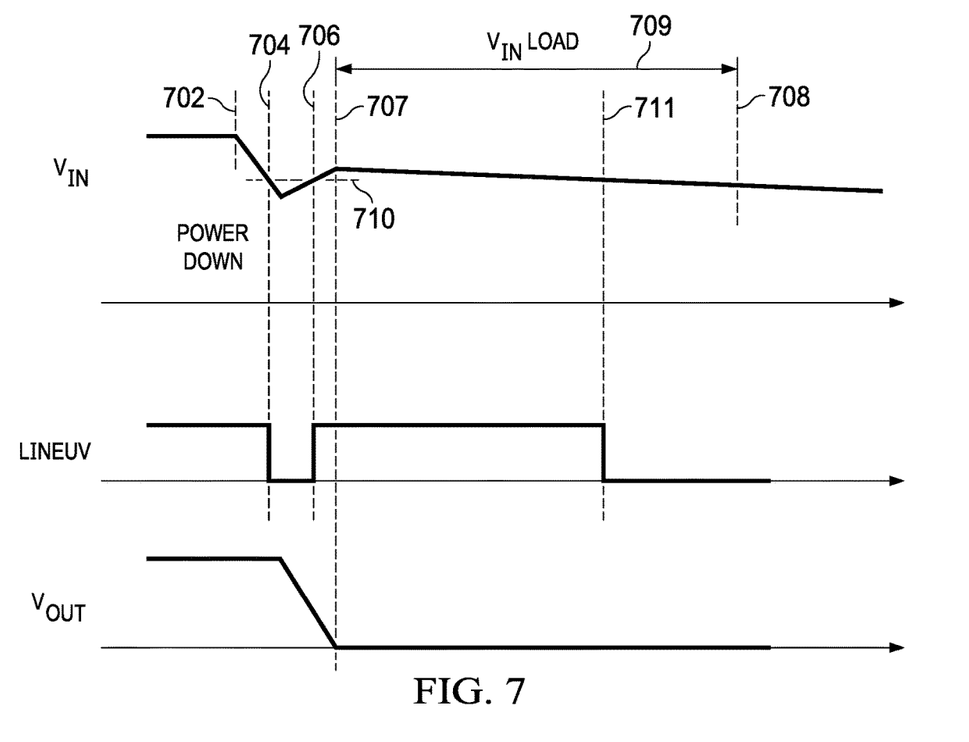
FIG. 7 is a timing diagram of example signals in a switching converter with soft stop operation and last gasp prevention.

FIG. 7 shows an example of soft stop operation with last gasp prevention as provided by the switching converter controller 211A. In FIG. 7, $V_{IN}$ is switching converter input voltage, LINEUV indicates whether $V_{IN}$ is above or below the threshold voltage LINEUV threshold 710, and $V_{OUT}$ is switching converter output voltage. At time 702, $V_{IN}$ begins to decrease to power down the switching converter. At time 704, $V_{IN}$ falls below the LINEUV threshold 710, and the switching converter initiates soft stop operations. During soft stop, $V_{OUT}$ decreases, and energy is transferred from the output capacitance to the input capacitance of the switching converter, causing $V_{IN}$ to exceed the LINEUV threshold 710 at time 706. At time 707, $V_{OUT}$ has dropped near zero volts, and soft stop is complete, which triggers the timer circuit 404 and connection of a load (e.g., the resistor 502) to the power stage power input 224A to discharge the input capacitor CIN. The power stage power input 224A is loaded over the interval 709 (as timed by the timer circuit 404). And at time 711, $V_{IN}$ falls below the LINEUV threshold 710. At time 708, the load is disconnected from the power stage power input 224A, and the switching converter controller 211A waits for $V_{IN}$ to exceed the threshold voltage LINEUV to restart the switching converter. Thus, soft stop is provided, and last gasp incidents are prevented.

Figure 8:
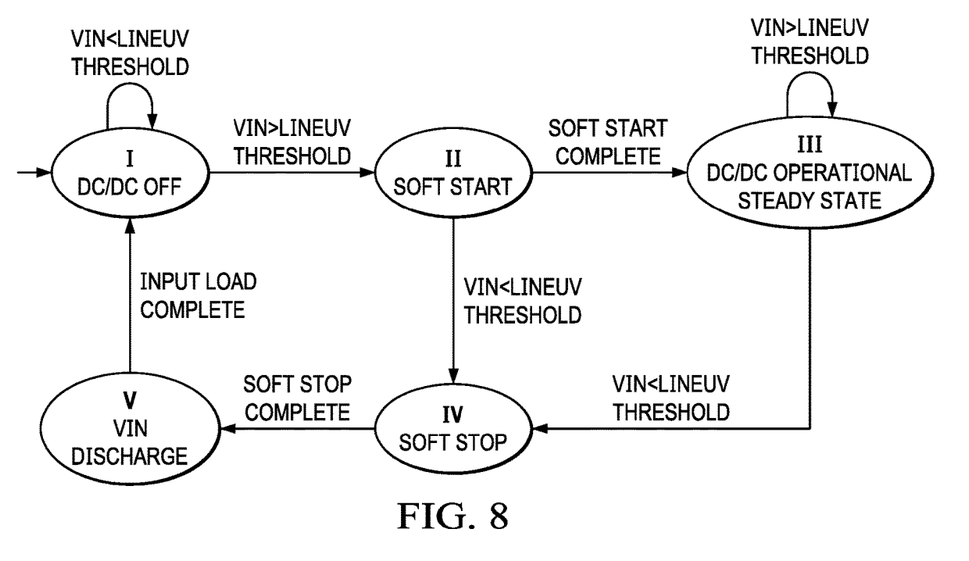
FIG. 8 is a state diagram of example operation state transitions in a switching converter that provides soft stop and last gasp prevention.

FIG. 8 shows operation state transitions in the switching converter controller 211. The state operations illustrated in FIG. 8 may be performed by the state machine circuit 250. In state I, the input voltage VIN is less than the LINEUV threshold, and the switching converter is off (i.e., no DC to DC conversion is performed). When the input voltage VIN increases and exceeds the LINEUV threshold, the state machine circuit 250 transitions from state I to state II. In state II, soft start operations are performed to bring VOUT to a desired voltage at a controlled rate. When soft start operations are complete (e.g., VOUT is at the desired voltage), the state machine circuit 250 transitions from state II to state III. In state III, DC to DC conversion continues while VIN exceeds the LINEUV threshold.

When VIN drops to less than the LINEUV threshold, the state machine circuit 250 transitions from state III to state IV. In state IV, soft stop operations are performed to reduce VOUT in a controlled manner. When soft stop operations are complete, the state machine circuit 250 transitions from state IV to state V. In state V, a load (e.g., the resistor 502) is connected (e.g., via the switch 504) to the power stage power input 224 of the switching converter to discharge the input capacitor CIN, and activation of the power stage is disabled. When a duration set for discharging the input capacitor CIN expires, the state machine circuit 250 transitions from state V back to state I where activation of the power stage is enabled.

In this description, the term "couple" or "couples" may cover connections, communications, or signal paths that enable a functional relationship consistent with this description. For example, if device A generates a signal to control device B to perform an action: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A. Also, in this description, the recitation "based on" means "based at least in part on." Therefore, if X is based on Y, then X may be a function of Y and any number of other factors.

Modifications are possible in the described embodiments, and other embodiments are possible, within the scope of the claims.

What is claimed is:

1. A switching converter controller, comprising:
    a detection circuit including:
        a voltage input; and
        a soft stop output;
    a timer circuit including:
        an input coupled to the soft stop output; and
        a timer output; and
    an input load circuit including a bias circuit coupled between the voltage input and a ground terminal, in which the bias circuit includes a control input coupled to the timer output, and the bias circuit is configured to selectively reduce a resistance between the voltage input and the ground terminal responsive to a signal at the control input.

2. The switching converter controller of claim 1, further comprising a capacitor coupled to the voltage input, in which the bias circuit is configured to discharge the capacitor by selectively reducing the resistance between the voltage input and the ground terminal responsive to the signal at the control input.

3. The switching converter controller of claim 1, wherein the detection circuit is configured to provide a soft stop signal responsive to a voltage at the voltage input being less than a line undervoltage threshold voltage.

4. The switching converter controller of claim 1, wherein the timer circuit is configured to time a duration for the bias circuit to reduce the resistance between the voltage input and the ground terminal.

5. A switching converter controller, comprising:
    a detection circuit including:
        a voltage input; and
        a soft stop output;
    a timer circuit including:
        an input coupled to the soft stop output; and
        a timer output; and
    an input load circuit including a switch and a load coupled between the voltage input and a ground terminal, in which the switch includes a control input coupled to the timer output, and the switch is configured to selectively connect the voltage input through the load to the ground terminal responsive to a signal at the control input.

6. The switching converter controller of claim 5, wherein the load includes a resistor.

7. The switching converter controller of claim 5, further comprising a capacitor coupled to the voltage input, in which the switch is configured to discharge the capacitor by selectively connecting the voltage input through the load to the ground terminal responsive to the signal at the control input.

8. The switching converter controller of claim 5, wherein the detection circuit is configured to provide a soft stop signal responsive to a voltage at the voltage input being less than a line undervoltage threshold voltage.

9. The switching converter controller of claim 5, wherein the timer circuit is configured to time a duration for the switch to connect the voltage input through the load to the ground terminal.

10. A switching converter controller, comprising:
    a detection circuit including:
        a voltage input; and
        a soft stop output;
    a timer circuit including:
        an input coupled to the soft stop output; and
        a timer output;
    an input load circuit including:
        a first input coupled to the timer output; and
        a second input coupled to the voltage input; and
    a state machine circuit coupled to the timer circuit, the state machine circuit configured to:
        enable activation of a power stage responsive to an expiration of a discharge time specified by the timer circuit; and
        disable activation of the power stage during the discharge time.

11. A switching converter controller, comprising:
    a detection circuit configured to initiate a soft stop operation responsive to a comparison between: a voltage at a voltage input; and a line undervoltage threshold voltage;
    a timer circuit configured to time a duration of reduced resistance between the voltage input and a ground terminal, responsive to the soft stop operation; and
    an input load circuit including a bias circuit coupled between the voltage input and the ground terminal, in which the bias circuit is configured to selectively reduce the resistance between the voltage input and the ground terminal for the duration of reduced resistance timed by the timer circuit.

12. The switching converter controller of claim 11, wherein the timer circuit is configured to initiate timing of the duration of reduced resistance responsive to a completion of the soft stop operation.

13. A switching converter controller, comprising:
a detection circuit configured to initiate a soft stop operation responsive to a comparison between: a voltage at a voltage input; and a line undervoltage threshold voltage;
a timer circuit configured to time a duration of reduced resistance between the voltage input and a ground terminal, responsive to the soft stop operation; and
an input load circuit including a switch and a load coupled between the voltage input and the ground terminal, in which the switch is configured to selectively connect the voltage input through the load to the ground terminal for the duration of reduced resistance timed by the timer circuit.

14. The switching converter controller of claim 13, wherein the load includes a resistor.

15. The switching converter controller of claim 13, wherein the timer circuit is configured to initiate timing of the duration of reduced resistance responsive to a completion of the soft stop operation.

16. A switching converter controller, comprising:
a detection circuit configured to initiate a soft stop operation responsive to a comparison between: a voltage at a voltage input; and a line undervoltage threshold voltage;
a timer circuit configured to time a duration of reduced resistance between the voltage input and a ground terminal, responsive to the soft stop operation;
an input load circuit coupled between the voltage input and the ground terminal, in which the input load circuit is configured to selectively reduce the resistance between the voltage input and the ground terminal for the duration of reduced resistance timed by the timer circuit; and
a state machine circuit coupled to the timer circuit, the state machine circuit configured to:
enable activation of a power stage responsive to an expiration of the duration of reduced resistance timed by the timer circuit; and
disable activation of the power stage during the duration of reduced resistance timed by the timer circuit.

17. The switching converter controller of claim 16, wherein the timer circuit is configured to initiate timing of the duration of reduced resistance responsive to a completion of the soft stop operation.

18. A switching converter, comprising:
a power stage including:
a power supply input;
an input capacitor coupled to the power supply input; and
a power supply output; and
a switching converter controller configured to control the power stage, the switching converter controller including:
a voltage input coupled to the power supply input;
a detection circuit configured to:
compare a voltage at the voltage input to a line undervoltage threshold voltage; and
provide a soft stop signal responsive to the voltage at the voltage input being less than the line undervoltage threshold voltage;
an input load circuit coupled to the voltage input and configured to switchably discharge the input capacitor; and
a timer circuit configured to time a duration of discharge of the input capacitor responsive to the soft stop signal.

19. The switching converter of claim 18, wherein:
the input load circuit includes a switch configured to couple a load to the voltage input for the duration of discharge timed by the timer circuit.

20. The switching converter of claim 19, wherein the load includes a resistor configured to conduct current from the voltage input to a ground terminal via the switch.

21. The switching converter of claim 19, wherein the load includes a bias circuit configured to conduct current from the voltage input to a ground terminal via the switch.

22. The switching converter of claim 18, wherein the switching converter controller includes a state machine circuit coupled to the timer circuit, the state machine circuit configured to:
enable activation of the power stage responsive to an expiration of the duration of discharge timed by the timer circuit; and
disable activation of the power stage during the duration of discharge timed by the timer circuit.

* * * * *